July 7, 1959  R. C. QUACKENBUSH  2,893,276
AUTOMATIC TOOL FEEDING DEVICE
Filed May 13, 1955  2 Sheets-Sheet 1
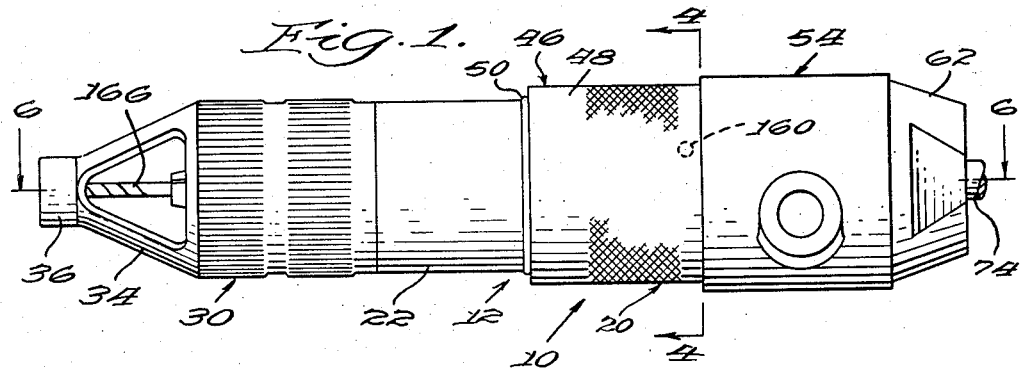
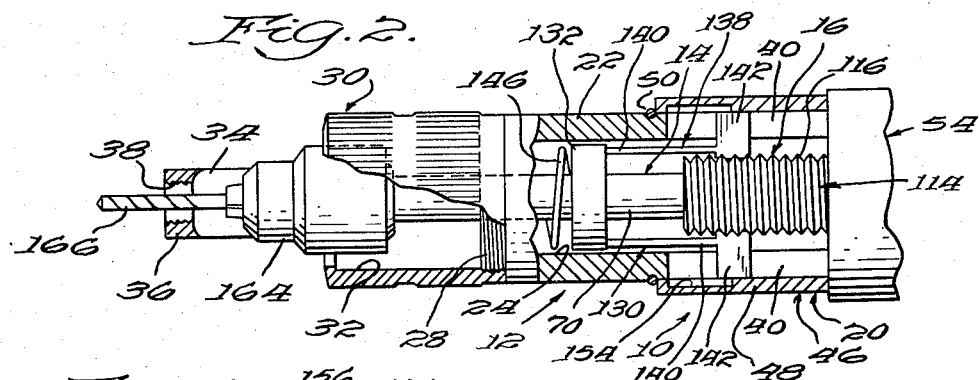
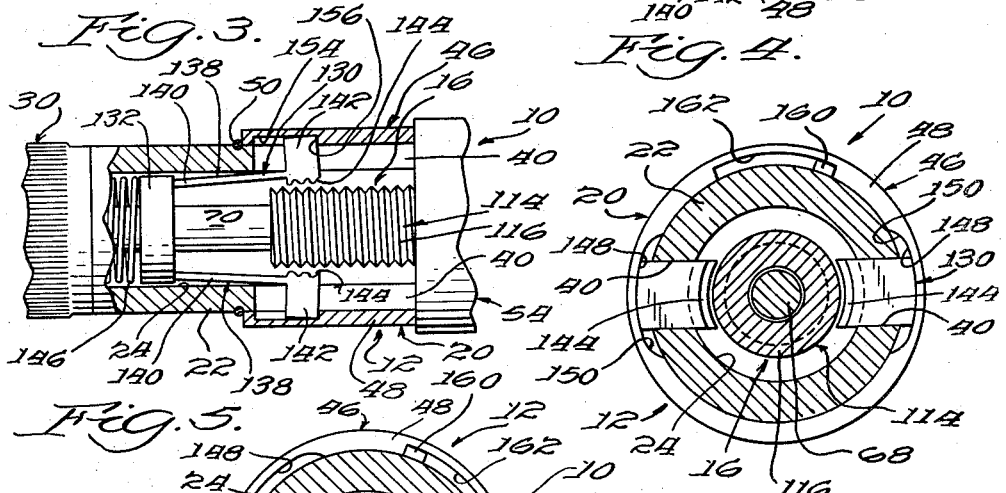
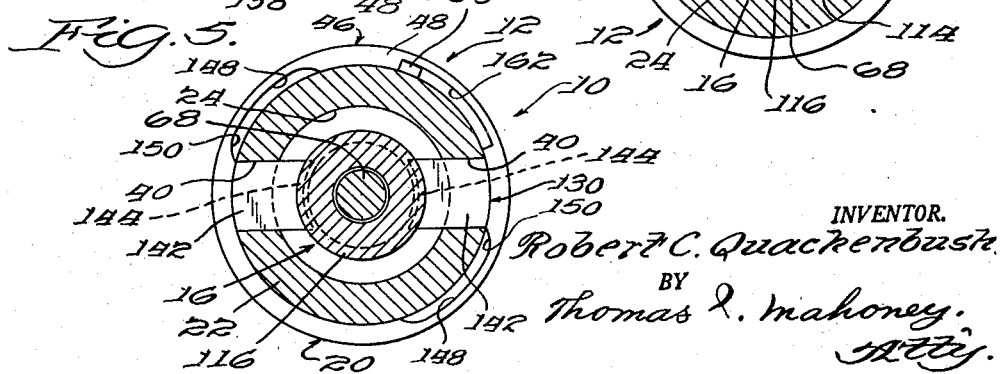
INVENTOR.
Robert C. Quackenbush
BY Thomas L. Mahoney.
Atty.

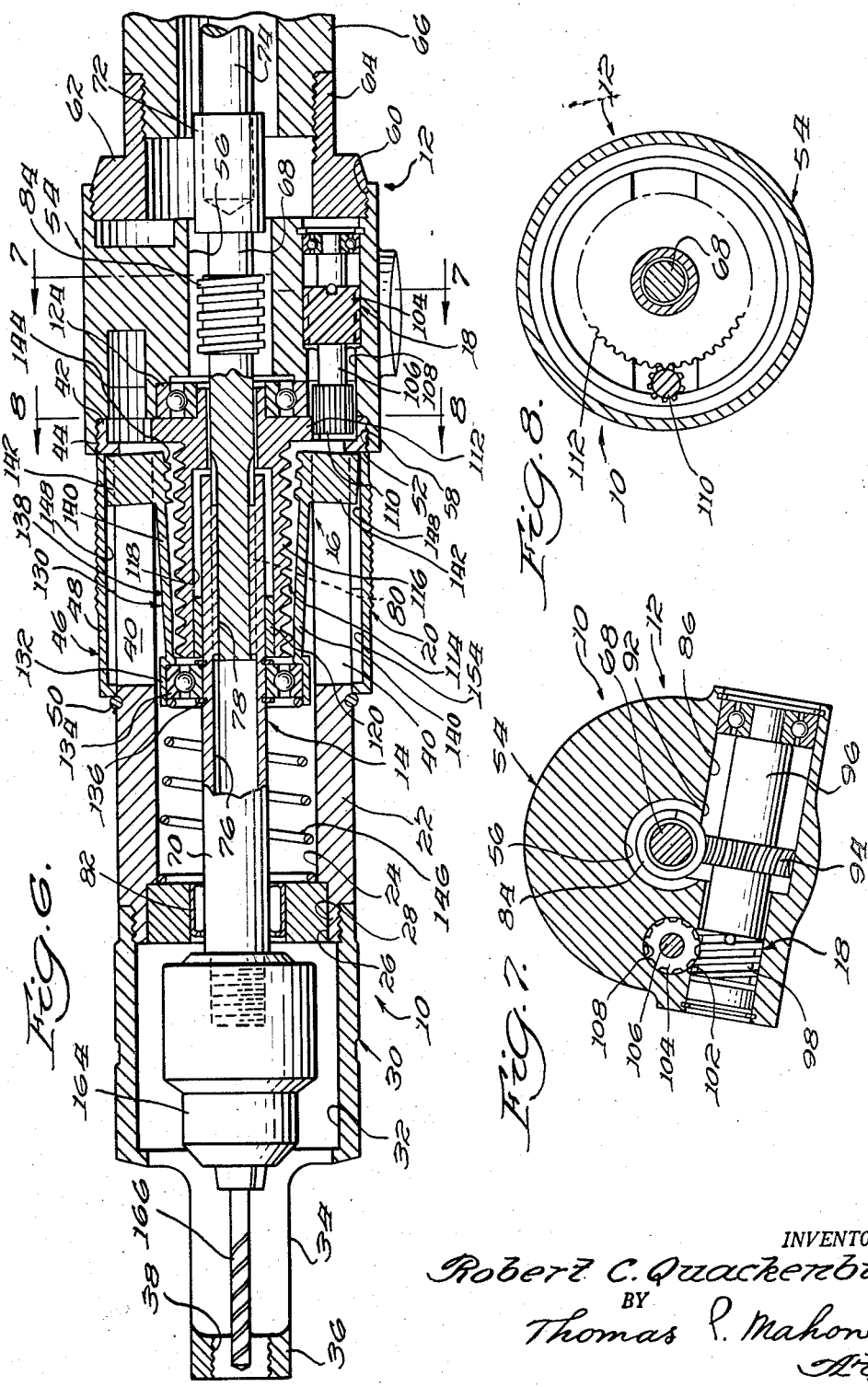

United States Patent Office 2,893,276
Patented July 7, 1959

2,893,276

AUTOMATIC TOOL FEEDING DEVICE

Robert C. Quackenbush, San Fernando, Calif.

Application May 13, 1955, Serial No. 508,223

10 Claims. (Cl. 77—34.4)

This invention relates to a device for automatically feeding a rotary tool into a work piece at a predetermined rate.

In recent years, industry has been utilizing harder metals, such as stainless steel, and the harder aluminum alloys as materials for component parts and great difficulty has been encountered in the utilization of conventional methods of drilling, boring, and reaming these harder metals. The difficulty encountered has been attributable, in large part, to the fact that the metals are so hard that conventional rotary tools cannot be fed thereinto at the customary rate, nor can the same pressures be exerted upon the tool during the operation upon the work piece. However, inexperienced employees have attempted to operate upon these harder metals at the same speed and with the same pressures utilized in the operations upon softer materials with the results of increased tool breakage and wear and damage to the work piece.

It is, therefore, an object of my invention to provide a tool feeding device which is relatively simple and com- the work piece at a predetermined rate so that the rate at which the tool is fed into the work piece is beyond the control of the operator and may be predetermined by the use of suitable means, to be described hereinbelow, in accordance with the hardness of the material utilized in the fabrication of the work piece.

An additional object of my invention is the provision of a tool feeding device which is relatively simple and compact and light in weight and which can, therefore, be utilized as a part of or in conjunction with conventional hand tools so that it can be used by operators in the conventional manner in operating upon a work piece. In the presently disclosed embodiment of my invention, the construction is particularly adapted to be used in conjunction with conventional power tools and constitutes an attachment therefor, but it will be obvious to those skilled in the art that the principles of my invention can be applied with equal cogency to and incorporated in various types of tools other than hand tools.

Another object of my invention is the provision of a tool feeding device for feeding a tool into a work piece which incorporates a tool mounting and tool driving drive shaft, said drive shaft having power take-off means associated therewith for driving feeding means adapted to longitudinally translate said drive shaft to carry a tool mounted thereupon into the work piece.

A further object of my invention is the provision of a device of the aforementioned character wherein the power take-off includes speed reducing means so that the rate of advancement of the drive shaft and, therefore, of the tool mounted thereupon is in a predetermined ratio to the speed of rotation of the drive shaft. Since the rate of advance of a tool into a work piece can be determined for different types and hardnesses of materials, the speed reducing means incorporated in the power take-off of my invention can be readily changed so that the ratio between the speed of rotation of the drive shaft and the speed of advancement of the drive shaft toward the work piece can be readily altered to suit the needs of the particular job.

Another object of my invention is the provision of a device of the aforementioned character wherein the aforesaid feeding means includes a clutch engageable with the remainder of the feeding means and operable by a control member so that when the control member is energized the clutch is engaged with the remainder of the feeding means to cause longitudinal translation of the drive shaft of the device between a first retracted and a second extended position.

Other objects and advantages of my invention will be apparent from the following specification and the accompanying drawings which are for the purpose of illustration only and in which:

Fig. 1 is a side elevational view of a tool feeding device constructed in accordance with the teachings of my invention;

Fig. 2 is an enlarged, partly sectional view of a portion of the tool feeding device;

Fig. 3 is an enlarged, fragmentary view of a portion of the tool feeding device;

Fig. 4 is a vertical, sectional view taken on the broken line 4—4 of Fig. 1;

Fig. 5 is a vertical, sectional view similar to that of Fig. 4 but showing the component parts viewed in a different position from that assumed by said parts in Fig. 4;

Fig. 6 is a longitudinal, sectional view taken on the broken line 6—6 of Fig. 1;

Fig. 7 is a vertical, sectional view taken on the broken line 7—7 of Fig. 6; and Fig. 8 is a vertical, sectional view taken on the broken line 8—8 of Fig. 6.

Referring to the drawings and particularly to Figs. 1 and 6 thereof, I show a tool feeding device 10 constructed in accordance with the teachings of my invention and incorporated in a housing, generally indicated at 12. The tool feeding device 10, as best shown in Fig. 6 of the drawings, generally includes a main drive shaft 14, feeding means 16 for causing longitudinal translation of said main drive shaft within the housing 12, and power take-off means 18 constituting a part of said feeding means and disposed in driven relationship with the main drive shaft 14.

A control 20 is provided on the housing 12 and serves to energize the feeding means 16 to cause the aforementioned longitudinal translation of the main drive shaft 14 within the housing 12.

The housing 12 of the tool feeding device 10 is constituted, as best shown in Figs. 1 and 6 of the drawings, by a main body portion 22, said main body portion having an elongated bore 24 formed therethrough terminating at its outer extremity in a relatively short counterbore 26. A reduced threaded annulus 28 is, as best shown in Figs 2 and 6 of the drawings, provided on the outer extremity of the main body portion 22 for the reception of a similarly threaded portion of a foot member 30. The foot member 30 defines a chamber 32 and is provided with an extension 34 terminating in an annular boss 36 having a thread 38 provided upon the inner diameter thereof to facilitate its attachment to a jig, or similar fixture.

The inner extremity of the main body portion 22 of the housing 12 is provided with elongated slots 40 which are disposed opposite each other, as best shown in Figs. 2–6 of the drawings. An enlarged annular boss 42 is formed upon the inner end of the main body portion 22 of the housing 12 and is provided with a peripheral thread 44.

A control member 46 is incorporated in the control 20 and constituted by an elongated, cylindrical sleeve 48 which is disposed in overlying relationship with the slots 40 in the main body portion 22 and is restrained from longitudinal movement upon said body portion by means of a snap ring 50 encompassing said main body portion and engaging the outer end of said sleeve and by the impingement of the inner end of said sleeve on the shoulder 52 defined by the enlarged annular boss 42.

Threadedly engaged upon the annular boss 42 on the inner end of the main body portion 22 of the housing 12 and constituting a portion of said housing is a power take-off housing 54 which is provided with a centrally located bore 56 communicating at its opposite ends with counterbores 58 and 60, as best shown in Fig. 6 of the drawings. The counterbore 58 receives the threaded annular boss 42 on the inner end of the main body portion 22 of the housing 12 and the counterbore 60 is threaded for the reception of an adapter collar 62 which is provided with an axially extending portion 64 threadedly engageable upon the similarly threaded end of the housing 66 of a power source, the remainder of which is not shown.

The main drive shaft 14 is, as best shown in Fig. 6 of the drawings, composite in nature and constituted by a first portion 68 restrained against longitudinal movement in the housing 12 by being connected to the power source and a second portion 70 which can be longitudinally translated, in a manner to be described below, within the housing 12 between first retracted and second extended positions. The first portion 68 of the main drive shaft 14 is provided with an enlarged socket 72 upon its inner extremity.

The socket 72 is adapted to receive the outer end of a powered shaft 74 extending from a source of power, not shown, in the power tool and through the outer end 66 of said tool. The outer end of the powered shaft 74 can be keyed or threadedly engaged in the socket 72 so that rotation of the powered shaft 74 will cause concomitant rotation of the first portion 68 of the main drive shaft 14.

The second portion 70 of the main drive shaft 14 is provided with a longitudinal bore 76 having, as best shown in Fig. 6 of the drawings, a female spline 78 formed in the wall thereof for the reception of a male spline 80 provided on the outer reduced end of the first portion 68 of the main drive shaft 14 to establish a driving-driven relationship between the first and second portions 68 and 70 of said main drive shaft, respectively. Therefore, the first and second portions 68 and 70 of the main drive shaft 14 are disposed in telescoping relationship with each other and longitudinal movement of the second portion 70 of said main drive shaft with respect to the housing 12 may be accomplished, in a manner to be described in greater detail below.

The outer extremity of the second portion 70 of the main drive shaft 14 is journaled for rotation in a bearing 82 located in the counterbore 26 in the main body portion 22 of the housing 12. A worm 84 is, as best shown in Figs. 6 and 7 of the drawings, provided upon the first portion 68 of the main drive shaft 14 and constitutes the means whereby the main drive shaft 14 energizes the power take-off means 18. The periphery of the worm 84 extends, as best shown in Fig. 7 of the drawings, into a transverse bore 86 in the power take-off housing 54 through an opening 92 in the wall of said bore. The worm 84 engages a worm gear 94 mounted upon a shaft 96 in the bore 86. On the opposite extremity of said shaft is secured a helical gear 98 extending through an opening 102 in the wall of the bore 86 into engagement with a helical gear 104 which rotates a shaft 106 located in a bore 108 in the power take-off housing 54.

A gear 110 is, as best shown in Figs. 6 and 8 of the drawings, provided on the outer extremity of the shaft 106 and engages a spur gear 112 formed upon the inner end of an auxiliary drive shaft 114 constituted by an elongated lead screw 116.

The elongated lead screw 116 incorporates a bore 118 which receives a portion of the longitudinally movable second portion 70 of the main drive shaft 14 and has disposed therein a bearing 120, as best shown in Fig. 6 of the drawings, for supporting said second portion 70 of the main drive shaft 14. A bearing 124 mounted in the power take-off housing 54 supports the inner extremity of the lead screw 116 and the outer extremity thereof is supported upon the bearing 120.

A clutch 130 is located in the bore 24 of the main body portion 22 of the housing 12 and includes an annular outer end 132 which is mounted by a bearing 134 on the second portion 70 of the main drive shaft 14, the bearing being secured by means of snap rings 136 to the periphery of said second portion so that longitudinal movement of the clutch 130 will be accompanied by longitudinal movement of the second portion 70 of the main drive shaft 14. Therefore, the second portion 70 of the main drive shaft 14 can rotate relative to the annular outer end 132 of the clutch 130 during longitudinal translation of said second portion as occasioned by longitudinal movement of the clutch 130, in a manner to be described in greater detail below.

Formed integrally with the annular outer end 132 of the clutch 130 are compressible clutch members 138 which are constituted by elongated, resilient arms 140 having traveling quarter nuts 142 formed integrally on the inner ends thereof whose threads 144 are engageable with the thread of the lead screw 116. It will be noted that the quarter nuts 142 are biased outwardly in opposite directions by the action of the resilient arms 140 into the elongated slots 40 in the main body portion 22 of the housing 12. A compression spring 146 is, as best shown in Fig. 6 of the drawings, interposed between the bearing 82 and the bearing 134 supporting the clutch 130 to urge said clutch into a first innermost position and, when compressed, to permit said clutch to be moved from said first innermost position to a second outermost position thus carrying the second portion 70 of the main drive shaft 14 from first retracted to its second extended position.

When the clutch 130 is disposed in its first innermost position, as best shown in Figs. 4 and 6 of the drawings, the traveling nuts 142 extend outwardly beyond the confines of the slots 40, as best shown in Fig. 4, into oppositely disposed recesses 148 provided in the inner wall of the sleeve 48 constituting the control member 46. It will be noted that the opposite sides of the recesses 148 are provided with cam surfaces 150.

When the traveling nuts 142 are disposed in the positions shown in Figs. 4 and 6 of the drawings, the threads 144 thereupon are disengaged from the thread on the lead screw 116 to prevent rotary movement of the lead screw 116 from causing longitudinal translation of the clutch 130 and concomitant expansion of the second portion 70 of the main drive shaft 14 from the housing 12. However, when it is desired to engage the traveling nuts 142 with the lead screw 116, it is merely necessary to rotate the sleeve 48 to engage the cam surfaces 150 upon the backs of the nuts and drive them inwardly into engagement with the lead screw 116. The traveling nuts 142 are thus maintained in engagement with the lead screw 116 by the engagement of the inner wall of the control member 46 contiguous to the recesses 148 with the backs of the traveling nuts 142, as best shown in Fig. 5 of the drawings.

Thus, when the lead screw 116 is rotated by the action of the power take-off means 18 and the traveling nuts 142 are engaged therewith in the above described manner by the rotation of the control member 46, longitudinal translation of the clutch 130 from its first innermost to its second outermost positions will occur causing concomitant longitudinal movement of the second portion 70 of the main drive shaft 14 from its first retracted to its second extended positions. The engagement of the traveling nuts 142 with the lead screw 116 is graphically illustrated in Fig. 2 of the drawings, the inner wall of the control member 46 engaging the backs of the traveling nuts 142 to maintain them in operative relationship with the lead screw 116 until the main drive shaft second portion 70 reaches its full extended position. When this occurs, the clutch member 130, of course, also reaches its second outermost position and the resilient arms 140 of the clutch 130 bias the traveling nuts 142 outwardly into a recess 154 provided in the inner wall of the sleeve 48 at the outer extremity thereof.

At any time during the vertical movement of the second portion 70 of the main drive shaft, rotation of the control member 46 will register the traveling nuts 142 with the elongated recesses 148 in the sleeve 48 to return the portion 70 to its first, retracted position.

When the clutch 130 reaches its second outermost position, the spring 146 is, of course, fully compressed and as the traveling nuts 142 snap outwardly into the recess 154 provided in the sleeve 48, the spring urges the traveling nuts 142 into engagement with an edge 156 of said recess 154, as illustrated in Fig. 3 of the drawings.

The second portion 70 of the main drive shaft 14 is maintained in its extended position until the control member 46 is rotated to align the traveling nuts 142 with the recesses 148 in the sleeve 48 constituting the control member 46. When the recesses 148 and the traveling nuts 142 are thus aligned, the compression spring 146 urges the clutch 130 and thus the main drive shaft second portion 70 inwardly to return the main drive shaft portion 70 to its first retracted position and return the clutch 130 to its first innermost position, as shown in Fig. 6 of the drawings.

In order to control the rotation of the control member 46 with reference to the main body portion 22 of the housing 12, there is provided a stop pin 160 extending radially from said main body portion into engagement with a slot 162 provided in the inner wall of the sleeve 48, as best shown in Figs. 4 and 5 of the drawings. When the control sleeve 48 is located in a position to permit the disengagement of the traveling nuts 142 from the lead screw 116, the stop pin 160 is located at one end of the slot 162.

On the other hand, when the control sleeve 48 is rotated, the stop pin 160 ultimately engages the opposite end of the slot 162 to prevent further rotation of the sleeve 48. Therefore, when the traveling nuts 142 are disposed in the elongated recesses 148, they normally maintain the rotatable control sleeve 48 in position on the main body portion 22 of the housing 12 and when the control sleeve is rotated, the impingement of the stop pin 160 on an end of the slot 162 also serves to maintain the control sleeve 48 in a position in which the portions of its inner wall engaging the backs of the traveling nuts 142 will remain in juxtaposition thereto until the sleeve 48 is once again rotated to its inoperative position.

Disposed within the chamber 32 defined by the foot member 30 is a chuck 164 which is secured to the outermost end of the main drive shaft second portion 70. Located in the chuck 164 is a drill bit 166 which is adapted to be carried by the movement of the chuck 164 on the end of the main drive shaft second portion 70 into the work piece at a predetermined rate.

To utilize the device 10 of my invention it is merely necessary to energize the powered shaft 74 of the power source, not shown, to cause rotation of the main drive shaft 14 of the device. The rotation of the main drive shaft 14 causes rotation of the worm 84 on the first portion 68 thereof and causes simultaneous rotation of the gear train constituted by the gears 94, 98, 104, and 110. It should be noted at this juncture that the aforementioned gear train constitutes a reduction gearing, the ratio of which to the speed of the main drive shaft 14 can be varied by the substitution of gears of different sizes. This desirable end can be accomplished by merely extracting the shaft 96 from the bore 86 and substituting a different worm and worm gear for the worm 84 and worm gear 94.

Rotation of the reduction gear train which constitutes the power take-off means 18 of the device 10 causes concomitant rotation of the gear 112 and the auxiliary drive shaft 114 constituted by the elongated lead screw 116. Therefore, during rotation of the main drive shaft 14, the lead screw 116 rotates thereabout since it is coaxial therewith. With the clutch 130 disposed in the position shown in Fig. 6 of the drawings, which is its first innermost position, the traveling nuts 142 extend outwardly into the elongated recesses 148 in the control sleeve 48, thus permitting the traveling nuts 142 to be disengaged by the arms 140 from the thread on the lead screw 116. However, rotation of the control sleeve 48 causes the traveling nuts 142 to be cammed inwardly until their backs are engaged by adjacent portions of the inner wall of the control sleeve 48 which thus maintains the traveling nuts 142 in operative engagement with the lead screw 116.

The engagement of the traveling nuts 142 with the lead screw 116 causes movement of the clutch 130 and concomitant movement of the main drive shaft second portion 70 from its first retracted to its second extended position which thus is accompanied by the gradual feeding of the drill bit 166 into the work piece in a predetermined ratio to the speed of rotation of said drill bill. As the clutch 130 advances the main drive shaft second portion 70, the spring 146 is compressed. When the main drive shaft second portion 70 reaches its second extended position, the traveling nuts 142 register with the recess 154, as best shown in Fig. 3 of the drawings, and are urged upwardly thereinto by the resilience of the arms 140. As previously indicated, the main drive shaft second portion 70 is maintained in its extended position by the impingement of the traveling nuts 142 on the edge 156 of the recess 154 until the control sleeve 48 is rotated to juxtapose the ends of the elongated recesses 148 with the traveling nuts 142 permitting said traveling nuts and the clutch 130, of which they constitute a part, to be urged rearwardly in the bore 24 to carry said clutch to its first innermost position and the main drive shaft second portion 70 to its first retracted position.

Inward movement of the main drive shaft second portion 70, as induced by the action of the compression spring 146, is terminated by the impingement of the traveling nuts 142 upon the ends of the slots 40 in the main body portion 22 of the housing 12, as best shown in Fig. 6 of the drawings.

The power take-off means 18, the lead screw 116 constituting the auxiliary drive shaft 114, and the clutch 130 all comprise the feeding means 16 of the device for feeding the main drive shaft 14 between its first and second positions in the housing 12. It is readily apparent, therefore, that I provide by my invention a tool feeding device which is characterized by compactness and simplicity of construction and ease of operation. Furthermore, by the use of the device of my invention it is possible to change the ratio of speed of rotation of feed to speed of rotation of the tool bearing main drive shaft by the mere substitution of one gear train for another. Other objects and advantages of the invention will, of course, have been made apparent by the previous specification.

I claim as my invention:

1. In a device for longitudinally feeding a rotary tool into a work piece, said device being actuable by a source of power, the combination of: a housing; a main drive shaft in said housing having a longitudinally movable portion; a power take-off connected to said main drive shaft; an auxiliary drive shaft energizable by said power take-off; a clutch connected to said movable portion and engageable with said auxiliary drive shaft to cause longitudinal movement of said movable portion; and a control member on said housing for engaging said clutch with said auxiliary drive shaft to cause said longitudinal movement of said movable portion.

2. In a device for longitudinally feeding a rotary tool into a work piece, said device being actuable by a source of power, the combination of: a housing; a main drive shaft in said housing having a longitudinally movable portion; a power take-off connected to said main drive shaft; an auxiliary drive shaft energizable by said power take-off; a clutch connected to said movable portion and engageable with said auxiliary drive shaft to cause longitudinal movement of said movable portion; and a control member on said housing having means thereupon for engaging said clutch with said auxiliary drive shaft to cause said longitudinal movement of said movable portion.

3. In a device for longitudinally feeding a rotary tool into a work piece, said device being actuable by a source of power, the combination of: a housing; a main drive shaft in said housing having a longitudinally movable portion; a power take-off connected to said main drive shaft; an auxiliary drive shaft energizable by said power take-off; a clutch connected to said movable portion and engageable with said auxiliary drive shaft to cause longitudinal movement of said movable portion; and a rotatable control member on said housing having means thereupon for engaging said clutch with said auxiliary drive shaft to cause said longitudinal movement of said movable portion.

4. In a device for longitudinally feeding a rotary tool into a work piece, said device being actuable by a source of power, the combination of: a housing; a main drive shaft in said housing having a longitudinally movable portion; a power take-off connected to said main drive shaft; an auxiliary drive shaft energizable by said power take-off, said auxiliary drive shaft being constituted by a rotatable lead screw; a clutch connected to said movable portion having elements engageable with said lead screw to cause longitudinal movement of said movable portion; and a control member on said housing for engaging said element of said clutch with said lead screw to cause said longitudinal movement of said movable portion.

5. In a device for longitudinally feeding a rotary tool into a work piece, said device being actuable by a source of power, the combination of: a housing; a main drive shaft in said housing having a longitudinally movable portion; a power take-off connected to said main drive shaft; an auxiliary drive shaft energizable by said power take-off; a clutch connected to said movable portion and engagebale with said auxiliary drive shaft to cause longitudinal movement of said movable portion between first and second positions; spring means operatively connected to said movable portion for urging said movable portion into said first position; and a control member on said housing for engaging said clutch with said auxiliary drive shaft to cause said longitudinal movement of said movable portion toward said second position.

6. In a device for longitudinally feeding a rotary tool into a work piece, said device being actuable by a source of power, the combination of: a housing; a main drive shaft in said housing having a longitudinally movable portion; a power take-off connected to said main drive shaft; an auxiliary drive shaft energizable by said power take-off; a clutch connected to said movable portion and engageable with said auxiliary drive shaft to cause longitudinal movement of said movable portion between first and second positions; spring means operatively connected to said movable portion for urging said movable portion into said first position; and a control member on said housing for engaging said clutch with said auxiliary drive shaft to cause said longitudinal movement of said movable portion toward said second position, said control member having means thereupon engageable with said clutch for maintaining said clutch and said movable portion in said second position against the bias of said spring means.

7. In a tool feeding device for energization by a power source, the combination of: a housing; a rotatable main drive shaft in said housing having a portion fixed against longitudinal movement and an extensible portion mounted for longitudinal movement on said fixed portion and having a tool mount at its outer extremity; feeding means located in said housing intermediate its extremities, said feeding means including a drive gear secured to said fixed portion of said shaft and intermediate its extremities, and a power take-off connected to said drive gear, said power take-off being operatively connected to an elongated auxiliary drive shaft having a driven gear on its inner extremity constituting said operative connection, said feeding means including a clutch located intermediate the extremities of said housing and havng a clutch member fixed against rotation and movable into an operative position in which it causes the output of said power take-off to energize said auxiliary shaft to longitudinally shift said extensible portion out of said housing, said clutching member having resilient means associated therewith urging it into inoperative position; and a control mounted on said housing intermediate its extremities and including a rotatable control member operatively connected to said clutch member.

8. In a tool feeding device for energization by a power source, the combination of: a housing; a rotatable main drive shaft in said housing having a portion fixed against longitudinal movement and an extensible portion mounted for longitudinal movement on said fixed portion and having a tool mount at its outer extremity; feeding means located in said housing intermediate its extremities, said feeding means including a drive gear secured to said fixed portion of said shaft and intermediate its extremities, and a power take-off connected to said drive gear, said power take-off being operatively connected to an elongated auxiliary drive shaft having a driven gear on its inner extremity constituting said operative connection, said feeding means including a clutch located intermediate the extremities of said housing and having a clutching member fixed against rotation and movable into an operative position in which it causes the output of said power take-off to energize said auxiliary shaft to longitudinally shift said extensible portion out of said housing, said clutching member having resilient means associated therewith urging it into inoperative position; and a control mounted on said housing intermediate its extremities and including a rotatable control member operatively connected to said clutch member, said control including locating means to maintain said control member in an operative position against the bias of said resilient means.

9. In a tool feeding device for energization by a source of power, the combination of: a cylindrical housing; a rotatable drive shaft in said housing having a portion fixed against longitudinal movement and an extensible portion mounted for longitudinal movement on said fixed portion and having a tool mount on its outer extremity; feeding means disposable in driving relationship with said extensible portion and in driven relationship with the fixed portion of said shaft, said feeding means including a clutch having a clutching member movable inwardly into engagement with a portion of said feeding means to cause longitudinal movement of said extensible portion; and a control mounted intermediate the extremities of said housing including a control member constituted by a rotatable collar encompassing said housing, said control member having an internal cam engageable with said clutching member to urge it into operative position.

10. In a tool feeding device for energization by a source of power, the combination of: a cylindrical housing; a rotatable drive shaft in said housing having a portion fixed against longitudinal movement and an extensible portion mounted for longitudinal movement on said fixed portion and having a tool mount on its outer extremity; feeding means disposable in driving relationship with said extensible portion and in driven relationship with the fixed portion of said shaft, said feeding means including a clutch having a clutching member movable inwardly into engagement with a portion of said feeding means to cause longitudinal movement of said extensible portion; and a control mounted intermediate the extremities of said housing including a control member constituted by a rotatable collar encompassing said housing, said control member having an internal cam engageable with said clutching member to urge it into operative position and including a recess at its outer extremity for the reception of said clutching member to permit said clutching member to move into inoperative position at the conclusion of the longitudinal movement of said extensible portion of said shaft.

References Cited in the file of this patent

UNITED STATES PATENTS

| | | |
|---|---|---|
| 1,946,214 | Kabigting | Feb. 6, 1934 |
| 2,541,306 | Taylor | Feb. 13, 1951 |
| 2,777,339 | Hess | Jan. 15, 1957 |